May 7, 1940.  C. N. METCALF  2,199,892
POWER TRANSMISSION CABLE
Filed Aug. 18, 1939
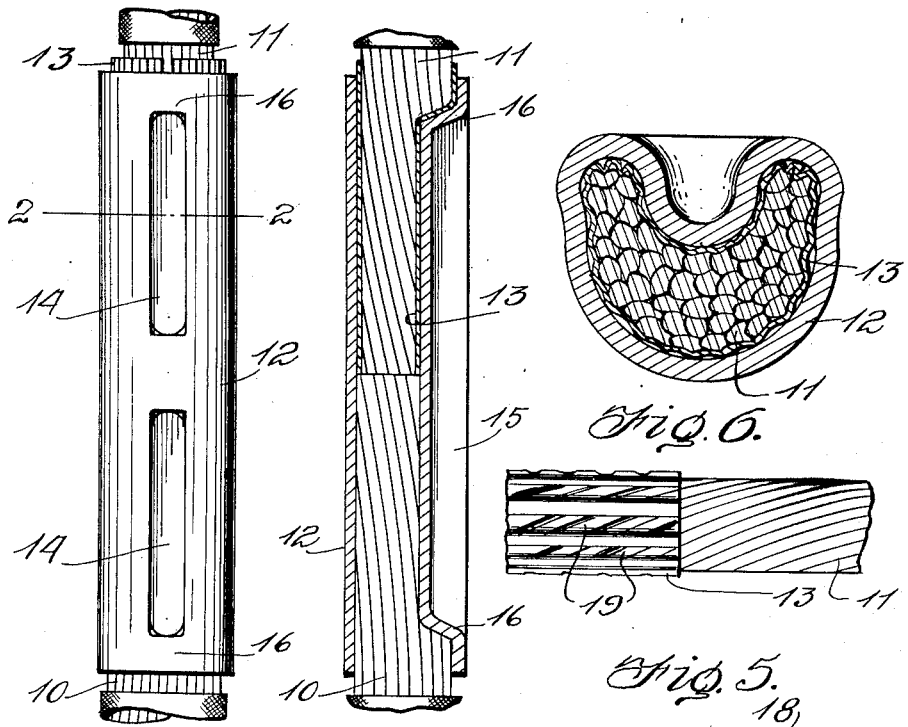
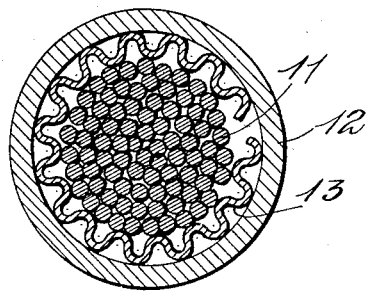
Inventor
Charles N. Metcalf,
By
Attorney Patented May 7, 1940

2,199,892

UNITED STATES PATENT OFFICE 2,199,892

POWER TRANSMISSION CABLE

Charles Nelson Metcalf, Hartsdale, N. Y., assignor to Consolidated Edison Company of New York, Inc., New York, N. Y., a corporation of New York Application August 18, 1939, Serial No. 290,913

2 Claims. (Cl. 287—75)

This invention relates to power transmission cables and has special reference to a joint for connecting two lengths of such cables when the diameters of the lengths are unlike, and to a method of forming such a joint.

More particularly the invention relates to improvements in the general type of joint shown in Figure 5 of the patent to Lewis K. Davis, No. 2,109,837 dated March 1, 1938.

One important object of the invention is to provide a novel joint assembly wherein the cable section of smaller diameter in such a joint will be held centrally in a deformable sleeve by novel adapter means of readily deformable character prior to deformation of the sleeve adapter and cable to secure the latter in place.

With the above and other objects in view, the invention consists in general of certain novel details of construction and combinations of parts and of a method of formation in and of cable joints of the character set forth as hereinafter fully described, illustrated in the accompanying drawing, and particularly pointed out in the appended claims.

In the accompanying drawing, like characters of reference indicate like parts in the several views, and Figure 1 is a side view of one form of the joint forming the invention.

Figure 2 is a section on the line 2—2 of Figure 1, but showing the appearance of the joint before deformation.

Figure 3 is a view similar to Figure 2 but showing the joint in its completed form.

Figure 4 is a diametric longitudinal section through a somewhat modified form of the joint.

Figure 5 is a cross section of such a joint and also disclosing the means for deforming the joint to secure the parts together.

Figure 6 is a view showing a portion of the adapter and cable and illustrating the interlocking of the cable and adapted upon deformation and compression of the latter.

In the present drawing, there is disclosed a pair of cables 10 and 11, each consisting of a multiplicity of strands. Of these cables, the cable 10 is of greater diameter than the cable 11, and it is a purpose of the invention to hold adjacent terminal portions of these cables in axial alignment in such a manner as to form a simple and efficient structure so highly resistant to stresses tending to part the cable that under all normal conditions of use and manipulation, the cables will be securely and permanently connected electrically.

In order to connect these cables, there is provided a deformable sleeve 12, formed from a suitable electrically-conductive material such, for instance, as copper. This sleeve is of uniform external diameter and of uniform internal diameter throughout its length. The internal diameter of the sleeve is such that the larger cable 10, when stripped of its insulation, will fit snugly therein. The cable 11 will, of course, when concentrically inserted in the sleeve, be spaced therefrom, and in order to center the cable 11 in the sleeve, there is provided a deformable adapter 13 consisting of a corrugated cylindrically shaped sheet of electrically-conductive material such, for instance, as copper. This cylindrically shaped sheet is preferably formed of thin material corrugated in the flat sheet and subsequently bent to cylindrical form and its corrugations run lengthwise and are of such depth as to cause the adapter to so fill the annular space between the cable 11 and sleeve 12 in such a manner as to center the cable and in the sleeve. It is to be noted that provision of the thin longitudinally corrugated adapter offers an improved construction over such constructions in which provision is made for small cables by either reducing the internal diameter of a portion of the sleeve and thus thickening the sleeve wall at the part surrounding the smaller cable or by providing a straight cylindrical adapter and thus causing the equivalent of increasing the sleeve wall thickness. The reason for this will be presently explained.

As shown in Figures 1, 2 and 3, after the parts have been assembled by fitting the adapter 13 on the end of the smaller cable 11 and then inserting the two cables in the sleeve, the sleeve, adapter and cables are deformed by forcing in longitudinally disposed portions of the sleeve as at 14 in Figure 1, or by forcing in a single longitudinal portion 15 (Figure 2) extending over both cable ends. The forced in portion or portions are spaced from the ends of the sleeve as at 16. It is to be observed that the use of the thin corrugated adapter provides but little resistance to this deformation, whereas a solid wall around the end of the smaller cable 11 would greatly enhance the resistance to such deformation. When the joint is thus completed, the adapter and wires of the cable form a closely compacted mass, and when so compacted, it will be impossible to separate the cables except by much greater stress than occurs under any condition of use or manipulation.

In Figure 5 is shown schematically a female die 17 for receiving the sleeve and a male die 18 for producing the required deformation. When thus deformed, the parts 14 or part 14 constitute inwardly projecting and longitudinally extending rib means for compacting the wires and adapter.

As will be seen from Figure 6, the adapter has its corrugations extending lengthwise, while the strands of the cable extend spirally. When, during the deformation of the parts, the adapter is compressed on the cable, it will at spaced points, such as are indicated at 19, be forced into the grooves between adjacent strands of the cable and will thus be mechanically interlocked with the cable.

What is claimed is:

1. A connector serviceable for securing the ends of swisted strand cables into a unitary whole, said connector comprising a sleeve of uniform interior bore of a diameter to receive directly a cable of larger diameter, an adapter fitted in the sleeve and formed with corrugations extending axially of the sleeve with the adapter of a diameter to snugly receive a cable of smaller diameter, whereby the axial corrugations of the adapter will cover and under pressure will interlock with the twisted strands of the cable when the latter is inserted.

2. A connector serviceable for securing the ends of twisted strand cables of different diameters into a unitary whole, said connector comprising a sleeve of uniform interior bore of a diameter to receive directly the cable of larger diameter, an adapter fitted in the sleeve and formed with corrugations extending axially of the sleeve with the adapter of a diameter to snugly receive the cable of smaller diameter, whereby the axial corrugations of the adapter will cover and under pressure will interlock with the twisted strands when the cable is inserted.

CHARLES NELSON METCALF.